METHOD OF MAKING ELECTRICAL CONDUCTORS ON INSULATING SUPPORTS

Filed Aug. 15, 1958

INVENTOR.
RICHARD P. HENNES
BY
Merchant & Merchant
ATTORNEYS

METHOD OF MAKING ELECTRICAL CONDUCTORS ON INSULATING SUPPORTS

Filed Aug. 15, 1958

INVENTOR.
RICHARD P. HENNES
BY
Merchant & Merchant
ATTORNEYS

United States Patent Office 2,984,597
Patented May 16, 1961

2,984,597

METHOD OF MAKING ELECTRICAL CONDUCTORS ON INSULATING SUPPORTS

Richard P. Hennes, 308 S. 6th St., Minneapolis, Minn., assignor of one-half to Leighton R. Johnson, Jr., Minneapolis, Minn.

Filed Aug. 15, 1958, Ser. No. 755,323
16 Claims. (Cl. 154—99)

My invention relates to the art of printed circuitry and more particularly to improved methods of manufacturing electrical conductors or circuit components on a suitable supporting base of insulating material.

In a general way, it may be stated that methods or processes for producing such circuit components or conductors on a backing of insulating material fall into two broad classifications, namely, (*a*) those processes or methods wherein the main bodies of the electrical conductors or circuit components are formed by removing, usually by etching, unwanted areas of a layer of suitable conductive metal such as copper; and (*b*) those processes or methods wherein the main bodies of the conductors or circuit components on the insulating base are formed by electrolytical disposition, usually through conventional electroplating procedure. My invention relates to improvements in methods or processes of the class last described under (*b*) above.

Among the important objectives of the instant invention are the provision of an improved method of the general character described whereby the resultant products may be inexpensively and quickly produced with a high degree of accuracy, dependability, and uniformity.

In common with similar products produced by methods of the prior art, the conductors produced by the instant method comprise main conductor bodies of a chosen conductive metal, usually copper, having over their outer surfaces coatings of dissimilar metal, usually silver, possessing a high degree of electrical conductivity and compatibility with conventional solders, which latter usually comprise lead and tin. These coated conductors must ultimately be connected in circuit with other conductors and in general practice such connections are made by solder joints. While the metal coatings of the conductor bodies have, as previously indicated, a high compatibility for solder, a pre-requisite to a good solder joint is a clean surface free of oxidization products. It is customary, therefore, to "tin" the entire exposed surface areas of the conductors, as part of the process of manufacturing the conductors on a permanent insulating base or circuit board, by dipping the permanent base or insulating board, together with its metallically coated circuit components or conductors, in molten solder to provide an over all coating of solder to which subsequent solder connections may be readily made and which, solder coating, prevents oxidation or contamination of the silver or other metallic coating of the conductors such as would resist tinning at a subsequent time. However, in practice, it is found that exposure of the outer surface of the metallic coating, generally silver, to atmosphere for even short periods of time, results in sufficient contamination and oxidation of the metallic coating to seriously interfere with subsequent surface tinning whether such be by dipping, to provide an over all tinning, or by spot tinning at the points where electrical connections are to be made.

Hitherto poor circuit connections, traceable to unsatisfactory tinning, have been a common and costly source of trouble in this industry. Hence, an important object of the instant invention is the provision of an improved method or process whereby troubles from this cause are eliminated. To this end I provide, in accordance with the instant invention, a temporary support in the nature of a wax-treated sheet of insulating material directly upon a waxed surface of which is applied a thin coating of conductive metal, typically silver, which is to represent the metallic coating of the conductor body or bodies on the permanent support; the main bodies of the conductors, typically copper, being deposited and formed on the exposed surface of this metallic coating of the temporary support and transferred therefrom to a permanent circuit board or support of insulating material, all while the coating of the conductors are sealed against contact with the air and resultant oxidization and contamination by the wax of the temporary support; the wax, in fact, protecting the metallic conductor coating right up to the time of ultimate tinning. In this connection it is important that even after removal of the wax-treated temporary support, wax therefrom will remain on the thin outer surface of the metallic conductor coating to protect the same against contamination and oxidation, unless such wax coating be intentionally removed. This protective wax coating may be, but need not be, removed by a suitable solvent immediately prior to tinning. However, the wax coating may be and preferably is ignored right up to and through the tinning procedure, in which case it is simply melted, displaced, and replaced by molten solder during the tinning operation or step. Hence, by this simple expedient of using a wax-treated temporary support, complete protection is afforded against surface oxidation and contamination of the metallic conductor coatings which occurs with surprising rapidity upon exposure of such surfaces to surrounding atmosphere, thereby contributing greatly to the accuracy, dependability and uniformity of the finished product and generally simplifying the manufacturing procedure and reducing production time.

The above and other highly important objects and advantages of the invention will be made apparent from the following specification, claims, and appended drawings.

In the accompanying drawings, like characters indicate like parts throughout the several views.

Referring to the drawings.

Figures 10, 11, 12:
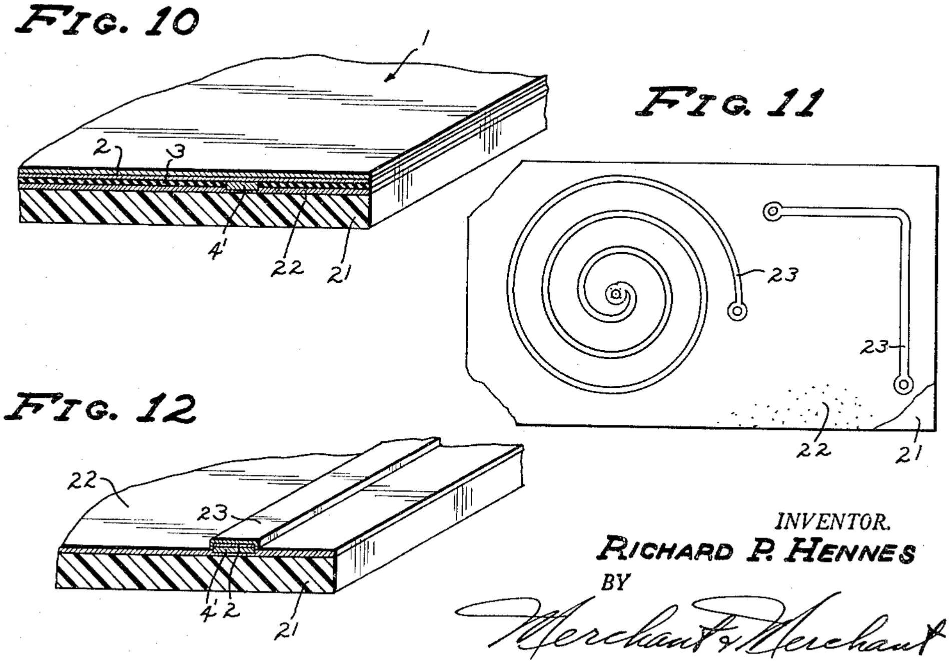
Fig. 10 is a still further enlarged fragmentary perspective view, with some parts broken away and some parts shown in section, representing the step of transferring the circuit components or conductors, formed during the step of Fig. 7 and partially shown in Fig. 8, from the temporary support to the permanent support of Fig. 9.

Fig. 11 is a plan or face view of the permanent support and applied circuit components or conductors after transfer of the circuit components or conductors thereto from the temporary support and at the completion of a further tinning step of the method or process; and Fig. 12 is a fragmentary perspective view, with some parts broken away and some parts shown in section, of a portion of the finished product of Fig. 11.

The first step in practicing the method or process hereof comprises the provision of a suitable non-conductive flexible temporary support on which to form the desired conductors or circuit components to be subsequently transferred to a permanent support. A preferred form of such temporary support is shown in the drawings and is indicated by 1. This temporary support 1, which is shown in its originally supplied unprocessed condition in Fig. 1, may comprise a wax-treated sheet of flexible insulating material. In fact, this temporary support 1 may be of conventional household wrapping wax paper such as is produced and sold by Rap-In-Wax Paper Company of St. Paul, Minnesota, under the trade name "Rap-In-Wax." Such commercially available wax-treated paper has been successfully used in the practice of the instant invention. However, experience indicates that a similar but heavier and somewhat less flexible material is to be preferred. Temporary supports of this commercially available material are expendable and discarded after a single use, but this fact is not objectionable due to the extremely low cost of the product mentioned. It should be understood, however, that the wax-treated temporary support may take other forms such, for example, as a thin sheet of flexible non-conductive plastic material coated on one flat face or side with a suitable wax which may be of the kind found in the above mentioned commercially available wax paper, or may be commercially available paraffine wax such as used for sealing home canned food products, or other varieties of wax having similar characteristics; the wax being applied to the plastic sheet as a very thin even coating. Temporary supports formed of these plastic sheets are, of course, more expensive than temporary supports of commercially available wax paper and the like, but this factor is largely or wholly offset by the fact that the plastic sheets are rendered reuseable many time over by merely recoating the same with wax or suitable wax-like material.

Figure 1:
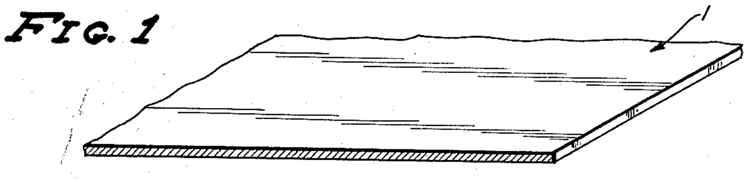
Fig. 1 is a greatly enlarged sectional perspective view, with some parts broken away, of one form of temporary support.
Figure 2:
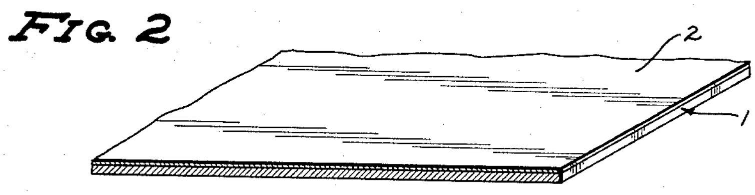
Fig. 2 is a view corresponding to Fig. 1 but showing the temporary support of Fig. 1 at the completion of a metallic coating step of the method.

The second step in the method hereof comprises applying over one flat face or surface of the temporary support 1 a thin even coating of suitable conductive metal. The temporary support 1 of Fig. 1 is shown at the completion of this conductive coating step in Fig. 2 wherein the conductive metallic coating is indicated by 2. This metallic coating 2 is preferably metallic silver and may be applied by spraying, in accordance with the teaching of the Nieter Patent #2,699,424 of January 11, 1955, for example, or by any other method whereby there is formed over the wax-treated surface of the temporary support a suitable or equivalent metallic coating. In fact, the metallic coating 2 on the temporary support 1 may be a very thin sheet of silver foil applied over a wax-treated surface of the temporary support 1 under such pressure and temperature as is required is to produce a suitable wax bond therebetween the base of the temporary support, be the latter paper, plastic, or the like. In practice it is found that a suitable bond between the metallic silver coating 2 and the wax of the temporary support 1 is achieved by the spray-on method of the Nieter patent mentioned.

Figure 3:
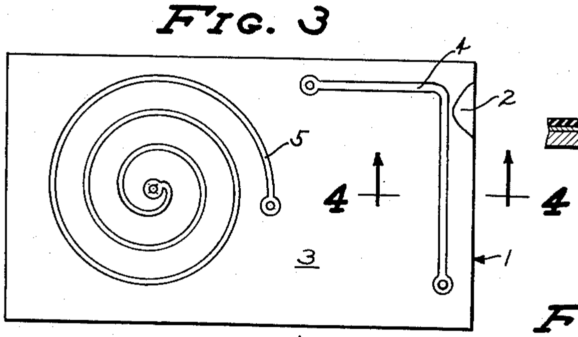
Fig. 3 is a side or face view of the temporary support of Fig. 1, but on a greatly reduced scale with respect to Fig. 1, after having formed thereon a negative or reverse image of certain desired electrical components or conductors by means of a suitable non-conductive masking material.
Figure 4:
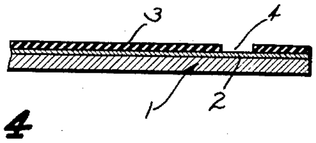
Fig. 4 is a greatly enlarged fragmentary sectional view taken on the line 4—4 of Fig. 3.

The next step in my improved method comprises forming over the metallic silver coating 2 of the temporary support 1 a reverse or negative image of the desired conductors or circuit components by means of a suitable non-conductive masking material; this step in the process being exemplified by Figs. 3 and 4. This masking material is applied as a very thin layer or coating over all major areas of the metallic coating 2, except those areas representative of the conductors or circuit components to be subsequently formed. In the drawings the thin coating of masking material is indicated by 3 and the open spaces therein representative of the conductors or circuit components to be formed as indicated by 4 and 5, respectively. This masking may be applied by any of several well-known procedures whereby suitable negative or reverse images of the desired conductors or circuit components are formed as an electrically non-conductive coating over the surface of the metallic coating 2 and the temporary support 1. One such procedure is to form the negative or reverse image of the conductors or circuit components by well-known photographic process wherein a suitable photographic emulsion is applied as a thin layer over the metallic coating 2, is exposed to a light image of the desired circuit components or conductors and is chemically developed to eradicate those areas of the photographic emulsion representative of the circuit components or conductors. In this case, all those surfaces areas of the metallic coating 2, except those representative of the images of the desired conductors or circuit components, remains as a non-conductive coating as indicated by 3 in the drawings, and particularly in Fig. 4 thereof.

Another and equally successful method of producing the image defining, non-conductive masking 3 is by means of conventional printing technique utilizing etched plates bearing the representations of the desired conductors or circuit components and a suitable non-conductive inking material. An inking or masking material suitable for this purpose can be produced by mixing two parts of processed (boiled) linseed oil, one part Glidden's asphalt paint of the kind customarily used by engravers for touching up irregularities or imperfections in photo etch resist, and one part commercial benzine. This composition makes a standard stock solution which may be further cut with benzine to provide the desired consistency for application. While this inking material is preferably applied by conventional printing process using said etched printing plates, aid material, or other suitable mask producing inking material, may also be applied by the well-known silk screen process to produce the negative or reverse images of the desired conductor or conductors. It will be understood, of course, that in all instances the areas coated by the masking material 3, regardless of how such be produced, will be nonconductive.

Figure 6:
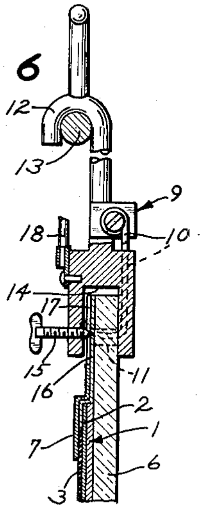
Fig. 6 is a greatly enlarged detail view, partly in section and partly in elevation, with some parts broken away, taken approximately on the line 6—6 of Fig. 5.
Figure 5:
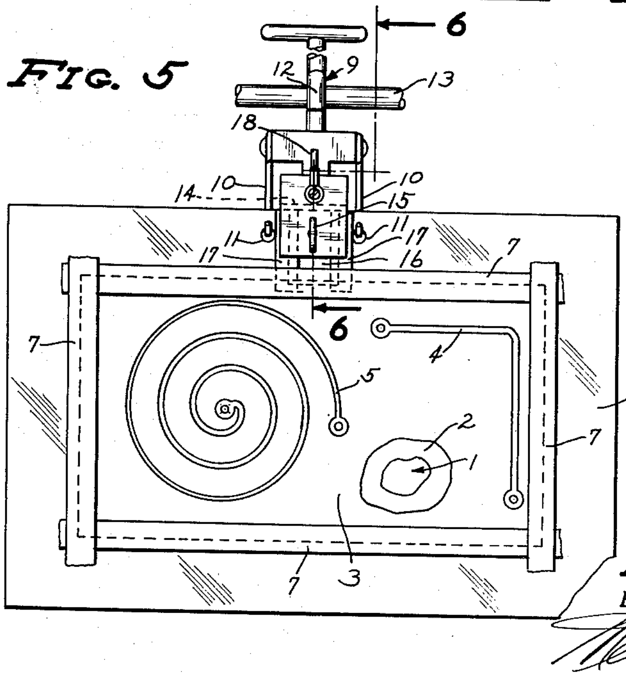
Fig. 5 is a side view similar to Fig. 3, with some portions broken away, but showing the masked temporary support of Fig. 3 taped to a rigid backing which serves as an auxiliary support, and further illustrating a clamp and conductor structure for use during a subsequent electroplating step.
Figure 7:
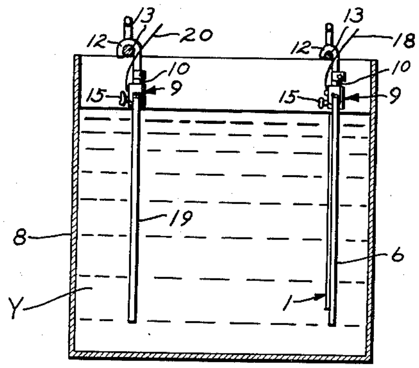
Fig. 7 is a diagrammatic view illustrative of the electroplating step of the method, wherein the main bodies of the conductors or circuit components are formed on the exposed metallic surfaces of the coated and masked temporary support of Figs. 3 and 6.

As a further preparation for the electroplating step, as exemplified in Fig. 7, the now metallically coated and masked temporary support 1 of Figs. 3 and 4 is mounted, masked side out, on a rigid auxiliary support 6 shown in Figs. 5–7, and which preferably takes the form of a non-conductive glass plate. Preferably, this mounting of the coated and masked temporary support 1 of Figs. 3 and 4 on the auxiliary support 6 of Figs. 5 and 6 is achieved by means of a suitable adhesively coated tape of a kind well-known in the electroplating arts and indicated by 7 in the drawings; the tape 7 being applied between the marginal edge portions of the temporary support 1 and the adjacent surface areas of the auxiliary support 6. The purpose of this mounting of the temporary support 1 on the auxiliary support is to add rigidity to the structure and to otherwise facilitate the handling of the relatively fragile and flexible coated and masked temporary support during the subsequent electroplating step.

The next step in the method comprises forming on the unmasked or exposed areas 4 of the silver coating of the temporary support, a layer of suitable metal, generally dissimilar to the metal of the coating 3 and preferably metallic copper, to define the main bodies of the desired conductors or circuit components pictorially defined by the masking 3. Preferably, and most conveniently, these conductor bodies are formed by metallic deposition utilizing well-known electroplating technique. In preferred practice the said conductor main bodies will be formed by electrolytic deposition, of copper, in accordance with conventional electroplating process or as disclosed, for example, in the said Nieter Patent #2,699,424. For this purpose the metallically coated and masked temporary support 1, mounted on the auxiliary support 6, as represented in Figs. 5 and 6, is suspended in a suitable electroplating bath *y* contained in a suitable vat or tank 8, as exemplified in Fig. 7. The suspension of the composite temporary and auxiliary support structure in the bath *y* may be accomplished in any desired or well-known manner, but is preferably accomplished through the use of clamps 9 of a kind well-known in the electrotype art. These clamps 9 are provided with depending hooks 10 which engage in holes 11 in the auxiliary support 6 located above the temporary support 1 and are also provided with upwardly directed hooks 12 which engage suspension rods 13 seated on the upper end of the tank or vat 8.

For the purpose of the electroplating step the metallic coating 2 on the temporary support 1 must be connected in a suitable electroplating circuit and for this purpose the clamps 9 are notched at 14 to receive the temporary support and are provided with clamping screws 15 located above the level of the top of the temporary support 1. To establish electrical contact between these screws 15 and the metallic coating 2 of the temporary support 1, a thin strip of copper 16 is generally clamped between the auxiliary support 6 and the inner end of the screw 15 and extended over and taped, as at 17 (see Fig. 5), in electrical contact with an area of the silver coating 2 from which the masking material 3 has been removed, usually by a suitable solvent such as commercial benzine in the case of masking ink compounded in accordance with the formula given above. The electrical connection to the clamp structure 9 is conveniently made through a wire conductor 18 extending therefrom, as shown best in Fig. 6. Of course, for the electroplating step a second electrode is necessary and such is indicated by 19 in Fig. 7 and may be suspended in the bath *y* through the medium of another clamp 9, or the like. In Fig. 7, one of the electroplating circuit leads is indicated by 18 and the other by 20. No attempt is made to show the balance of the electroplating circuit because of its conventional nature. However, it will be understood that during the electroplating procedure, the silver coating 2 of the temporary support 1, will serve as the cathode of the electroplating circuit, whereas the other electrode 19 will serve as the anode in the electroplating circuit. The electroplating step will be continued until copper has been deposited to the desired thickness on the exposed, unmasked areas of the silver coating 2, which latter serves as an electrical connection between all separated exposed areas representative of different conductors.

Figure 8:
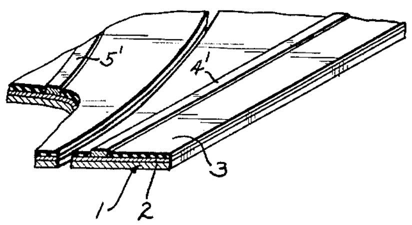
Fig. 8 is an enlarged fragmentary perspective view, with some parts broken away, of the metallically coated temporary support at the completion of the electroplating step of Fig. 7.

At the completion of the electroplating step and upon removal of the assembly from the electroplating bath *y* of Fig. 7, there will be deposited on the exposed, unmasked areas 4 and 5 of the silver coating 2 of the temporary support 1, copper layers comprising the main bodies 4' and 5', respectively, of the conductors or circuit components, respectively, represented by the said unmasked areas 4 and 5. As shown in Fig. 8, the copper conductor bodies 4' and 5' are somewhat thicker than the masking 3, but this occurrence or the extent thereof will, of course, depend upon the chosen thickness of the copper conductor bodies and the thickness of the masking.

The temporary support 1, complete with its silver coating 2, masking 3, and electrolytically deposited bodies 4' and 5', will usually be removed from the auxiliary glass plate support 6 at the completion of the above described electroplating process and is shown so removed in Fig. 8.

The next step in my improved method comprises transferring of the electrolytically deposited conductor of component bodies 4' and 5' from the temporary support 1 to a suitable permanent circuit board or support of insulating material. Such a permanent support or circuit board may comprise a flat sheet of relatively rigid, nonconductive plastic such as is exemplified at 21 in Figs. 9–12. However, the permanent support 21 may also take shapes other than flat such, for example, as cylindrical, since the temporary support 1, together with its conductive silver coating 2, the masking 3, and the electrolytically deposited bodies 4' and 5', are flexible and can be made to conform to non-flat or contoured surfaces.

Figure 9:
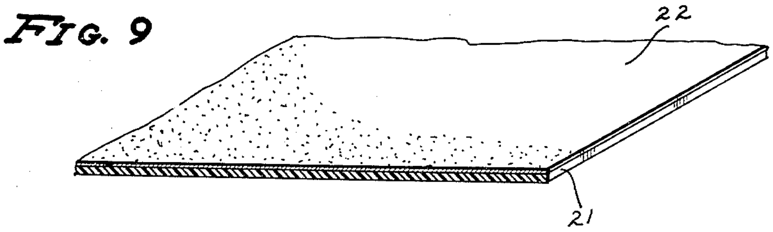
Fig. 9 is a greatly enlarged fragmentary perspective view, with some parts shown in section and some parts broken away, of a permanent support having an adhesive coating on one face or side surface thereof.

Preferably, this step of transferring the electrolytically deposited circuit component bodies 4' and 5' to the permanent support 21 will be as follows: First, one side or face of the permanent support 21 is coated with a thin even layer of suitable adhesive. For this purpose thermosetting adhesives are preferred and these are of a kind commonly used by and well-known in the art of printed circuitry for bonding printed circuit components, conductors and the like, to a permanent circuit board or base of support. Some of the possible sources of such suitable bonding agents or adhesives include United States Rubber Company, of Akron, Ohio, and Minnesota Mining & Manufacturing Co. of St. Paul, Minnesota. A coating of such a thermo-setting plastic on the permanent support 21 is shown in Figs. 9–11 wherein it is indicated by 22. After the adhesive coating or bonding agent 22 is applied to the base 21, as indicated in Fig. 9, it is brought into face to face contact with the masked and plated surface areas of the temporary support 1 to form a sandwich, as in Fig. 10. With the parts positioned as in Fig. 10, they are subjected to sufficient pressure from opposite sides and sufficient heat to set the adhesive coating 22 and produce a permanent bond between the electrolytically deposited bodies 4' and 5' and the permanent support 21. Of course, the amount of heat and pressure necessary to effect a satisfactory bond will depend, in this instance, upon the characteristics of the particular bonding agent or adhesive employed, and it is recommended that the adhesive suppliers directions be followed. In any event, however, the heat applied will be above the melting point of the wax substance with which the temporary support 1 is treated. It will be understood that during this step of transferring the conductor bodies 4' and 5' from the temporary support 1 to the permanent support 21, the masking 3 will isolate the adjacent surfaces of the silver coating 2 from and prevent adhesion thereof to the bonding agent or adhesive coating 22 of the permanent support 21. When the adhesive 22 is set and the bonding complete, the temporary support is removed. This removal of the temporary support may be done while the elements are at a temperature above the melting point of the wax or after cooling thereof to or near room temperature. In either event, some of those areas of the silver coating 2 covered by the masking are apt to strip off with the temporary support 1, whereas other portions of such areas may remain loosely on the permanent support due, at least in part, to the fact that the electrolytically deposited bodies 4' and 5' are permanently united with adjacent areas of the silver coating 2. Due to the fragile nature of the silver coating 2 unwanted portions thereof clinging to the circuit board or permanent support 21 may, together with remnants of masking material 3, be disposed of by a light wiping with a suitable masking solvent, such as commercial benzine.

It will be understood, of course, that upon stripping off of the wax-treated temporary support 1 from the permanent support 21, there will remain over the then exposed outer surfaces silver coating overlying the deposited conductor bodies 4' and 5', a thin coating of protective wax from the temporary support to protect the now silver-coated outer surfaces of the electrolytically deposited bodies 4' and 5' against contact with the air and resultant contamination and oxidation. Of course, if the cleaning and wiping operation, described above, is thorough enough, all of this wax will then be removed, but this operation can be so limited that this protective wax coating will only be partially removed from the conductor surfaces, thereby leaving sufficient wax to continue the surface protection pending a subsequent tinning operation.

In practice it is found that the cleaning operation above described can be omitted completely. In that case, the uncleaned and rather crude looking permanent support 21, together with the silver-coated conductors 4' and 5', remnants of masking material 3, and usually some remnants of excess silver coating 2, will be passed to the tinning step in just the condition thereof present upon removal of the temporary support 1. This tinning step generally comprises dipping of the entire unit, as last described above, in molten solder which automatically melts and displaces the carried over masking material and wax and replaces the wax removed from the silver coatings 2 of the copper bodies 4' and 5' with a coating of solder which latter, as previously indicated, is generally 50% lead and 50% tin. Obviously, when this procedure is followed, the silver coated surfaces of the electrolytically deposited bodies 4' and 5' are protected against oxidation and contamination right up to the instant of tinning, thereby virtually eliminating any possibility of subsequent solder joint failure due to faulty tinning. In this case the very small volume of excess silver coating remaining on the permanent support 21 at the time of solder dipping is absorbed into the solder to slightly increase, although not materially, its silver content, whereas the displaced wax and masking substance will float on top of the solder and can be skimmed off at intervals.

The completed product after completion of the tinning operation is shown in Figs. 11 and 12 wherein the solder coating is indicated by 23.

Depending upon the nature of the permanent support, it is both possible and practical in some instances to transfer the deposited conductor bodies from the temporary support to the permanent support and to bond the conductors to the permanent support without the use of a special adhesive as described above. In this case a suitable plastic material is chosen for the permanent support and the deposited conductor bodies are bonded thereto by application of sufficient temperature and pressure to affect a permanent bond directly between the conductors and the permanent support. In this instance, the conductors will usually be embedded quite deeply or even entirely in the body of the permanent support.

What is claimed is:

1. A method of manufacturing an electrical conductor of desired configuration on a permanent supporting base of insulating material, said method comprising steps as follows: providing a temporary support non-conductive material having a wax-treated side surface, applying to a waxed side of the temporary support a thin and fragile electrically conductive metallic coating, applying over a portion of the surface of the conductive coating a layer of non-conductive masking material that is resistant to electrolytic deposition and defines a negative representation of an electrical conductor of desired configuration, electrolytically depositing on the unmasked areas of the conductive metallic coating a layer of conductive metal to a thickness greater than that of the layer of masking material to provide on said conductive coating an electrical conductor main body of said predetermined configuration, placing the exposed surface of the conductor thus formed against and bonding it to a permanent supporting base of insulating material, and removing the temporary support from the permanent support while leaving on the permanent support the deposited main conductor body and those areas of the metallic coating on which said conductor body was deposited together with a protective coating of wax over the latter from the temporary support, the wax of the temporary support having thus protected the now outer surface of the metallic coating over the deposited conductor body against contamination and oxidation from the instant of application thereof to the temporary support and continuing such protection after removal of the temporary support.

2. A method of manufacturing an electrical conductor of desired configuration on a permanent supporting base of insulating material, said method comprising steps as follows: providing a temporary support comprising a sheet of non-conductive flexible material having a wax-treated side surface, applying to a waxed side of the temporary support a thin and fragile electrically conductive metallic coating, applying over a portion of the surface of the conductive coating a layer of non-conductive masking material that is resistant to electrolytic deposition and defines a negative representation of an electrical conductor of desired configuration, electrolytically depositing on the unmasked areas of the conductive metallic coating a layer of conductive metal to a thickness greater than that of the layer of masking material to provide on said conductive coating an electrical conductor main body of said predetermined configuration, placing the exposed surface of the conductor thus formed against and bonding it to a permanent supporting base of insulating material, and removing the temporary support from the permanent support while leaving on the permanent support the deposited main conductor body and those areas of the metallic coating on which said conductor body was deposited together with a protective coating of wax over the latter from the temporary support, the wax of the temporary support having thus protected the now outer surface of the metallic coating over the deposited conductor body against contamination and oxidation from the instant of application thereof to the temporary support and continuing such protection after removal of the temporary support.

3. A method of manufacturing an electrical conductor of desired configuration on a permanent supporting base of insulating material, said method comprising steps as follows: providing a temporary support comprising a sheet of flexible non-conductive plastic material having a coating of wax over a side surface thereof, applying to a waxed side of the temporary support a thin and fragile electrically conductive metallic coating, applying over a portion of the surface of the conductive coating a layer of non-conductive masking material that is resistant to electrolytic deposition and defines a negative representation of an electrical conductor of desired configuration, electrolytically depositing on the unmasked areas of the conductive metallic coating a layer of conductive metal to a thickness greater than that of the layer of masking material to provide on said conductive coating an electrical conductor main body of said predetermined configuration, placing the exposed surface of the conductor thus formed against and bonding it to a permanent supporting base of insulating material, and removing the temporary support from the permanent support while leaving on the permanent support the deposited main conductor body and those areas of the metallic coating on which said conductor body was deposited together with a protective coating of wax over the latter from the temporary support, the wax of the temporary support having thus protected the now outer surface of the metallic coating over the deposited conductor body against contamination and oxidation from the instant of application thereof to the temporary support and continuing such protection after removal of the temporary support.

4. The method defined in claim 1 further comprising the step of tinning a wax protected surface area of the metallic coating of the conductor body on the permanent support by applying thereto molten solder to displace and replace the wax coating thereof carried over from the temporary support.

5. The method defined in claim 2 further comprising the step of tinning a wax protected surface area of the metallic coating of the conductor body on the permanent support by applying thereto molten solder to displace and replace the wax coating thereof carried over from the temporary support.

6. The method defined in claim 3 further comprising the step of tinning a wax protected surface area of the metallic coating of the conductor body on the permanent support by applying thereto molten solder to displace and replace the wax coating thereof carried over from the temporary support.

7. The method defined in claim 1 further comprising the step of tinning the wax protected surface of the metallic coating of the conductor body on the permanent support by dipping the permanent support in molten solder to displace and replace the wax coating thereof carried over from the temporary support, whereby to provide a solder coating over the before said metallic coating of the conductor body.

8. The method defined in claim 2 further comprising the step of tinning the wax protected surface of the metallic coating of the conductor body on the permanent support by dipping the permanent support in molten solder to displace and replace the wax coating thereof carried over from the temporary support, whereby to provide a solder coating over the before said metallic coating of the conductor body.

9. The method defined in claim 3 further comprising the step of tinning the wax protected surface of the metallic coating of the conductor body on the permanent support by dipping the permanent support in molten solder to displace and replace the wax coating thereof carried over from the temporary support, whereby to provide a solder coating over the before said metallic coating of the conductor body.

10. The method defined in claim 1 wherein the said metallic coating is metallic silver and wherein the said electrolytically deposited body is metallic copper.

11. The method defined in claim 4 wherein the said metallic coating is metallic silver and wherein the said electrolytically deposited body is metallic copper.

12. The method defined in claim 7 wherein the said metallic coating is metallic silver and wherein the said electrolytically deposited body is metallic copper.

13. The method defined in claim 1 wherein the step of bonding the deposited conductor body to the permanent support comprises the application of heat to raise the temperature of the wax on the temporary support above the melting point of the wax.

14. The method defined in claim 4 wherein the step of bonding the deposited conductor body to the permanent support comprises the application of heat to raise the temperature of the wax on the temporary support above the melting point of the wax.

15. The method defined in claim 7 wherein the step of bonding the deposited conductor body to the permanent support comprises the application of heat to raise the temperature of the wax on the temporary support above the melting point of the wax.

16. The method defined in claim 10 wherein the step of bonding the deposited conductor body to the permanent support comprises the application of heat to raise the temperature of the wax on the temporary support above the melting point of the wax.

References Cited in the file of this patent

UNITED STATES PATENTS

| | | |
|---|---|---|
| 1,563,731 | Ducas | Dec. 1, 1925 |
| 1,946,865 | Kubin | Feb. 13, 1934 |
| 2,692,190 | Pritikin | Oct. 19, 1954 |
| 2,734,150 | Beck | Feb. 7, 1956 |